US012798877B2

(12) United States Patent
Heggebø

(10) Patent No.: US 12,798,877 B2
(45) Date of Patent: Nov. 17, 2026

(54) ASSEMBLY FOR RETRIEVING STORAGE ELEMENTS

(71) Applicant: Autostore Technology AS, Nedre Vats (NO)

(72) Inventor: Jørgen Djuve Heggebø, Langhus (NO)

(73) Assignee: AutoStore Technology AS, Nedre Vats (NO)

( * ) Notice: Subject to any disclaimer, the term of this patent is extended or adjusted under 35 U.S.C. 154(b) by 337 days.

(21) Appl. No.: 18/287,434

(22) PCT Filed: May 16, 2022

(86) PCT No.: PCT/EP2022/063149
§ 371 (c)(1),
(2) Date: Oct. 18, 2023

(87) PCT Pub. No.: WO2022/248264
PCT Pub. Date: Dec. 1, 2022

(65) Prior Publication Data
US 2024/0199324 A1 Jun. 20, 2024

(30) Foreign Application Priority Data
May 28, 2021 (NO) .................................... 20210680

(51) Int. Cl.
*B65G 1/04* (2006.01)
*B65G 1/06* (2006.01)

(52) U.S. Cl.
CPC ........... *B65G 1/0464* (2013.01); *B65G 1/065* (2013.01)

(58) Field of Classification Search
CPC ...... B65G 1/065; B65G 1/0457; B65G 1/026; B65G 1/0464; B65G 1/0492
See application file for complete search history.

(56) References Cited

U.S. PATENT DOCUMENTS 2,645,538 A * 7/1953 Segal ........................ A47B 9/00 248/421
4,181,078 A * 1/1980 Davis ..................... B65H 29/54 101/90
(Continued)

FOREIGN PATENT DOCUMENTS

CN 205009216 U 2/2016
CN 106697923 A 5/2017
(Continued)

OTHER PUBLICATIONS

Coquau, Stephane, Office Action for European Patent Application No. 22729193.7, dated Nov. 29, 2024, 5 pages, pub. by the EPO, Rijswijk Netherlands.
(Continued)

*Primary Examiner* — Glenn F Myers
(74) *Attorney, Agent, or Firm* — Baker Botts L.L.P.

(57) ABSTRACT

An assembly is for handling goods holders, such as storage containers, storage trays, and/or storage pallets, of an automated storage and retrieval system. The assembly includes a base body, a lifting frame, a gripper, and at least one connecting element. The base body is for connection to a lifting device for vertical transportation of the goods holders in a storage column. The lifting frame has a central opening, and is arranged at a vertical distance below said base body. The gripper is associated with the lifting frame and for engaging with the goods holder. The at least one connecting element is for connecting the lifting frame and the base body. The vertical distance between the lifting frame and the base body is variable.

21 Claims, 6 Drawing Sheets

(56) References Cited

U.S. PATENT DOCUMENTS

| | | | | |
|---|---|---|---|---|
| 5,211,296 | A | 5/1993 | D'Heygere | |
| 5,423,503 | A * | 6/1995 | Tanaka | H01L 21/67781 248/277.1 |
| 8,628,289 | B1 * | 1/2014 | Benedict | B65G 1/0478 414/217 |
| 9,198,508 | B1 * | 12/2015 | Kufel | A47B 47/024 |
| 9,266,674 | B2 * | 2/2016 | Reimer | B65G 1/026 |
| 10,294,025 | B2 * | 5/2019 | Hognaland | B65G 1/0478 |
| 2005/0220581 | A1 | 10/2005 | Chuang et al. | |
| 2018/0319590 | A1 | 11/2018 | Lindbo et al. | |
| 2020/0223633 | A1 * | 7/2020 | Stadie | B65G 15/28 |
| 2021/0016966 | A1 | 1/2021 | Teggebøet al. | |
| 2021/0024294 | A1 * | 1/2021 | Sekiya | H01L 21/67733 |
| 2021/0391201 | A1 * | 12/2021 | Lin | B66F 9/183 |

FOREIGN PATENT DOCUMENTS

| | | | |
|---|---|---|---|
| CN | 108349653 | A | 7/2018 |
| CN | 109607242 | A | 4/2019 |
| CN | 112389920 | A | 2/2021 |
| DE | 102019111709 | A1 | 11/2020 |
| WO | 317366 | B1 | 10/2004 |
| WO | 2014/075937 | A1 | 5/2014 |
| WO | 2014/090684 | A1 | 6/2014 |
| WO | 2015/193278 | A1 | 12/2015 |
| WO | 2018/146304 | A1 | 8/2018 |
| WO | 2019/206482 | A1 | 10/2019 |
| WO | 2019/206487 | A1 | 10/2019 |
| WO | 2019/238694 | A1 | 12/2019 |
| WO | 2019/238697 | A1 | 12/2019 |
| WO | 2020/094339 | A1 | 5/2020 |
| WO | 2020/210558 | A1 | 10/2020 |
| WO | 2020/220949 | A1 | 11/2020 |

OTHER PUBLICATIONS

International Search Report issued in PCT/EP2022/063149 on Sep. 19, 2022 (5 pages).

Written Opinion of the International Searching Authority issued in PCT/EP2022/063149 on Sep. 19, 2022 (7 pages).

Norwegian Search Report issued in No. 20210680 mailed on Dec. 22, 2021 (2 pages).

Han, Yingying, Office Action in CN202280033323.3, mailed Jan. 17, 2026, 18 pages, The State Intellectual Property Office of the People's Republic of China, Beijing, China.

Han, Yingying, Office Action in CN202280033323.3, mailed Jul. 4, 2026, 6 pages, The State Intellectual Property Office of the People's Republic of China, Beijing, China.

* cited by examiner

ASSEMBLY FOR RETRIEVING STORAGE ELEMENTS

The present invention relates to an assembly for handling storage elements, such as storage containers and/or storage trays, of an automated, grid-based storage and retrieval system. The invention further relates to an automated, grid-based storage and retrieval system comprising said assembly.

BACKGROUND AND PRIOR ART

FIG. 1 discloses a prior art automated storage and retrieval system 1 with a framework structure 100 and FIGS. 2, 3 and 4 disclose three different prior art container handling vehicles 201, 301, 401 suitable for operating on such a system 1.

The framework structure 100 comprises upright members 102 and a storage volume comprising storage columns 105 arranged in rows between the upright members 102. In these storage columns 105 storage containers 106, also known as bins, are stacked one on top of one another to form container stacks 107. The members 102 may typically be made of metal, e.g. extruded aluminum profiles.

The framework structure 100 of the automated storage and retrieval system 1 comprises a rail system 108 arranged across the top of framework structure 100, on which rail system 108 a plurality of container handling vehicles 301, 401 may be operated to raise storage containers 106 from, and lower storage containers 106 into, the storage columns 105, and also to transport the storage containers 106 above the storage columns 105. The rail system 108 comprises a first set of parallel rails 110 arranged to guide movement of the container handling vehicles 301, 401 in a first direction X across the top of the frame structure 100, and a second set of parallel rails 111 arranged perpendicular to the first set of rails 110 to guide movement of the container handling vehicles 301, 401 in a second direction Y which is perpendicular to the first direction X. Containers 106 stored in the columns 105 are accessed by the container handling vehicles 301, 401 through access openings 112 in the rail system 108. The container handling vehicles 301, 401 can move laterally above the storage columns 105, i.e. in a plane which is parallel to the horizontal X-Y plane.

The upright members 102 of the framework structure 100 may be used to guide the storage containers during raising of the containers out from and lowering of the containers into the columns 105. The stacks 107 of containers 106 are typically self-supportive.

Each prior art container handling vehicle 201, 301, 401 comprises a vehicle body 201*a*, 301*a*, 401*a* and first and second sets of wheels 201*b*, 201*c*, 301*b*, 301*c*, 401*b*, 401*c* which enable lateral movement of the container handling vehicles 201, 301, 401 in the X direction and in the Y direction, respectively. In FIGS. 2-4, two wheels in each set are fully visible. The first set of wheels 201*b*, 301*b*, 401*b* is arranged to engage with two adjacent rails of the first set 110 of rails, and the second set of wheels 201*c*, 301*c*, 401*c* is arranged to engage with two adjacent rails of the second set 111 of rails. At least one of the sets of wheels 201*b*, 201*c*, 301*b*, 301*c*, 401*b*, 401*c* can be lifted and lowered, so that the first set of wheels 201*b*, 301*b*, 401*b* and/or the second set of wheels 201*c*, 301*c*, 401*c* can be engaged with the respective set of rails 110, 111 at any one time.

Each prior art container handling vehicle 201, 301, 401 also comprises a lifting device for vertical transportation of storage containers 106, e.g. raising a storage container 106 from, and lowering a storage container 106 into, a storage column 105. The lifting device comprises one or more gripping/engaging devices which are adapted to engage a storage container 106, and which gripping/engaging devices can be lowered from the vehicle 201, 301, 401 so that the position of the gripping/engaging devices with respect to the vehicle 201, 301, 401 can be adjusted in a third direction Z which is orthogonal the first direction X and the second direction Y. Parts of the gripping device of the container handling vehicles 301, 401 are shown in FIGS. 3 and 4 indicated with reference number 304, 404. The gripping device of the container handling device 201 is located within the vehicle body 201*a* in FIG. 2.

Conventionally, and also for the purpose of this application, Z=1 identifies the uppermost layer available for storage containers below the rails 110, 111, i.e. the layer immediately below the rail system 108, Z=2 the second layer below the rail system 108, Z=3 the third layer etc. In the exemplary prior art disclosed in FIG. 1, Z=7 identifies the lowermost, bottom layer of storage containers. Similarly, X=1 . . . n and Y=1 . . . n identifies the position of each storage column 105 in the horizontal plane. Consequently, as an example, and using the Cartesian coordinate system X, Y, Z indicated in FIG. 1, the storage container identified as 106' in FIG. 1 can be said to occupy storage position X=17, Y=1, Z=5. The container handling vehicles 201, 301, 401 can be said to travel in layer Z=0, and each storage column 105 can be identified by its X and Y coordinates. Thus, the storage containers shown in FIG. 1 extending above the rail system 108 are also said to be arranged in layer Z=0.

The storage volume of the framework structure 100 has often been referred to as a grid 104, where the possible storage positions within this grid are referred to as storage cells. Each storage column may be identified by a position in an X- and Y-direction, while each storage cell may be identified by a container number in the X-, Y- and Z-direction.

Each prior art container handling vehicle 201, 301, 401 comprises a storage compartment or space for receiving and stowing a storage container 106 when transporting the storage container 106 across the rail system 108. The storage space may comprise a cavity arranged internally within the vehicle body 201*a* as shown in FIGS. 2 and 4 and as described in e.g. WO2015/193278A1 and WO2019/206487A1, the contents of which are incorporated herein by reference.

FIG. 3 shows an alternative configuration of a container handling vehicle 301 with a cantilever construction. Such a vehicle is described in detail in e.g. NO317366, the contents of which are also incorporated herein by reference.

The cavity container handling vehicles 201 shown in FIG. 2 may have a footprint that covers an area with dimensions in the X and Y directions which is generally equal to the lateral extent of a storage column 105, e.g. as is described in WO2015/193278A1, the contents of which are incorporated herein by reference. The term 'lateral' used herein may mean 'horizontal'.

Alternatively, the cavity container handling vehicles 401 may have a footprint which is larger than the lateral area defined by a storage column 105 as shown in FIG. 4 and as disclosed in WO2014/090684A1 or WO2019/206487A1.

The rail system 108 typically comprises rails with grooves in which the wheels of the vehicles run. Alternatively, the rails may comprise upwardly protruding elements, where the wheels of the vehicles comprise flanges to prevent derailing. These grooves and upwardly protruding elements are collectively known as tracks. Each rail may comprise one track, or each rail may comprise two parallel tracks; in other rail systems 108, each rail in one direction may comprise one track and each rail in the other perpendicular direction may comprise two tracks.

WO2018/146304A1, the contents of which are incorporated herein by reference, illustrates a typical configuration of rail system 108 comprising rails and parallel tracks in both X and Y directions.

In the framework structure 100, a majority of the columns 105 are storage columns 105, i.e. columns 105 where storage containers 106 are stored in stacks 107. However, some columns 105 may have other purposes. In FIG. 1, columns 119 and 120 are such special-purpose columns used by the container handling vehicles 201, 301, 401 to drop off and/or pick up storage containers 106 so that they can be transported to an access station (not shown) where the storage containers 106 can be accessed from outside of the framework structure 100 or transferred out of or into the framework structure 100. Within the art, such a location is normally referred to as a 'port' and the column in which the port is located may be referred to as a 'port column' 119,120. The transportation to the access station may be in any direction, that is horizontal, tilted and/or vertical. For example, the storage containers 106 may be placed in a random or a dedicated column 105 within the framework structure 100, then picked up by any container handling vehicle and transported to a port column 119, 120 for further transportation to an access station. The transportation from the port to the access station may require movement along various different directions, by means such as delivery vehicles, trolleys or other transportation lines. Note that the term 'tilted' means transportation of storage containers 106 having a general transportation orientation somewhere between horizontal and vertical.

In FIG. 1, the first port column 119 may for example be a dedicated drop-off port column where the container handling vehicles 201, 301 can drop off storage containers 106 to be transported to an access or a transfer station, and the second port column 120 may be a dedicated pick-up port column where the container handling vehicles 201, 301, 401 can pick up storage containers 106 that have been transported from an access or a transfer station.

The access station may typically be a picking or a stocking station where product items are removed from or positioned into the storage containers 106. In a picking or a stocking station, the storage containers 106 are normally not removed from the automated storage and retrieval system 1, but are, once accessed, returned into the framework structure 100. A port can also be used for transferring storage containers to another storage facility (e.g. to another framework structure or to another automated storage and retrieval system), to a transport vehicle (e.g. a train or a lorry), or to a production facility.

A conveyor system comprising conveyors is normally employed to transport the storage containers between the port columns 119, 120 and the access station.

If the port columns 119, 120 and the access station are located at different levels, the conveyor system may comprise a lift device with a vertical component for transporting the storage containers 106 vertically between the port column 119, 120 and the access station.

The conveyor system may be arranged to transfer storage containers 106 between different framework structures, e.g. as is described in WO2014/075937A1, the contents of which are incorporated herein by reference.

When a storage container 106 stored in one of the columns 105 disclosed in FIG. 1 is to be accessed, one of the container handling vehicles 201, 301, 401 is instructed to retrieve the target storage container 106 from its position and transport it to the drop-off port column 119. This operation involves moving the container handling vehicle 201, 301 to a location above the storage column 105 in which the target storage container 106 is positioned, retrieving the storage container 106 from the storage column 105 using the container handling vehicle's 201, 301, 401 lifting device (not shown), and transporting the storage container 106 to the drop-off port column 119. If the target storage container 106 is located deep within a stack 107, i.e. with one or a plurality of other storage containers 106 positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle that is subsequently used for transporting the target storage container to the drop-off port column 119, or with one or a plurality of other cooperating container handling vehicles. Alternatively, or in addition, the automated storage and retrieval system 1 may have container handling vehicles 201, 301, 401 specifically dedicated to the task of temporarily removing storage containers 106 from a storage column 105. Once the target storage container 106 has been removed from the storage column 105, the temporarily removed storage containers 106 can be repositioned into the original storage column 105. However, the removed storage containers 106 may alternatively be relocated to other storage columns 105.

When a storage container 106 is to be stored in one of the columns 105, one of the container handling vehicles 201, 301, 401 is instructed to pick up the storage container 106 from the pick-up port column 120 and transport it to a location above the storage column 105 where it is to be stored. After storage containers 106 positioned at or above the target position within the stack 107 have been removed, the container handling vehicle 201, 301, 401 positions the storage container 106 at the desired position. The removed storage containers 106 may then be lowered back into the storage column 105 or relocated to other storage columns 105.

For monitoring and controlling the automated storage and retrieval system 1, e.g. monitoring and controlling the location of respective storage containers 106 within the framework structure 100, the content of each storage container 106 and the movement of the container handling vehicles 201, 301, 401 so that a desired storage container 106 can be delivered to the desired location at the desired time without the container handling vehicles 201, 301, 401 colliding with each other, the automated storage and retrieval system 1 comprises a control system 500 (shown in FIG. 1) which typically is computerized and which typically comprises a database for keeping track of the storage containers 106.

WO2020/094339 discloses a system for container storage comprising an open lifting frame for releasable connection with the storage container. The lifting frame is provided with grippers. The presented solution allows access to objects in the storage container through the frame opening.

DE102019111709A1 discloses a technically complex system comprising a plurality of drive units where storage containers are movable in vertical as well as horizontal directions.

A general problem associated with the above-discussed and other prior art solutions that set out to efficiently handle storage elements is their prohibitive complexity.

In view of the above it is desirable to provide an automated storage and retrieval system that solves or at least mitigates one or more of the aforementioned problems related to use of prior art storage and retrieval systems.

SUMMARY OF THE INVENTION

The present invention is set forth and characterized in the independent claims, while the dependent claims describe other characteristics of the invention.

First aspect of the invention relates to an assembly for handling goods holders, such as storage containers, storage trays and/or storage pallets, of an automated storage and retrieval system, said assembly comprising:

- a base body for connection to a lifting device for vertical transportation of the goods holders in a storage column,
- a lifting frame having a central opening, said lifting frame being arranged at a vertical distance below said base body,
- engagement means associated with the lifting frame and for engaging with the goods holder,
- at least one connecting element for connecting the lifting frame and the base body, wherein
- the vertical distance between the lifting frame and the base body is variable.

By providing an assembly in accordance with the first aspect of the invention, a more versatile solution for handling goods holders is obtained. More specifically, it becomes possible to optimize the vertical size of the goods holder and greatly reduce dead volume in the interior of the goods holder. In this context, the vertical distance is reduced through the base body and the lifting frame approaching one another in consequence of vertical movement of said body and/or said frame. Hereby, more goods holder may be stored in a standard storage column of predetermined size.

In addition, many problems, frequently occurring when handling conventional storage units of given height may be alleviated. One of these problems is the presence of improperly loaded, thus overfilled, storage units with items bulging out of the unit and preventing proper gripping and securing of the storage unit. These situations are remedied by the assembly in accordance with the first aspect of the invention.

Moreover, loose, i.e. easily displaceable, items in the conventional storage units cause problems as they get reoriented and/or broken while the storage unit is being handled. This is remedied by allowing the base body to contact top portions of these loose items, in order to immobilize said loose items so as to prevent their displacement during handling.

Second aspect of the invention relates to a method for handling goods holders, such as storage containers, storage trays and/or storage pallets, of an automated storage and retrieval system, said method comprising:

- providing a base body for connection to a lifting device being part of container handling vehicle, wherein the lifting device vertically transports goods holders in a storage column,
- providing a lifting frame having a central opening, said lifting frame being arranged at a vertical distance below said base body,
- connecting the lifting frame and the base body by means of at least one connecting element so that the vertical distance between the lifting frame and the base body is variable, and
- providing engagement means associated with the lifting frame and for engaging with the goods holder.

For the sake of brevity, advantages discussed above in connection with the assembly for handling goods holders may even be associated with the corresponding method and are not further discussed.

Third aspect of the invention relates to an automated storage and retrieval system comprising a framework structure that comprises a plurality of storage columns for storing goods holders, wherein a rail system is arranged across the top of the framework structure, wherein a plurality of handling vehicles operates on said rail system, and wherein at least one handling vehicle comprises a lifting device for vertical transportation of the goods holders in a storage column, wherein said system comprises the above-discussed assembly.

The relative terms "upper", "lower", "below", "above", "higher" etc. shall be understood in their normal sense and as seen in a Cartesian coordinate system. When mentioned in relation to a rail system, "upper" or "above" shall be understood as a position closer to the surface rail system (relative to another component), contrary to the terms "lower" or "below" which shall be understood as a position further away from the rail system (relative another component).

BRIEF DESCRIPTION OF THE DRAWINGS

Following drawings are appended to facilitate the understanding of the invention. The drawings show embodiments of the invention, which will now be described by way of example only, where.

FIG. **5*a*** is a perspective view of an assembly for retrieving goods holders according to an embodiment of the present invention.

Figure 5A:
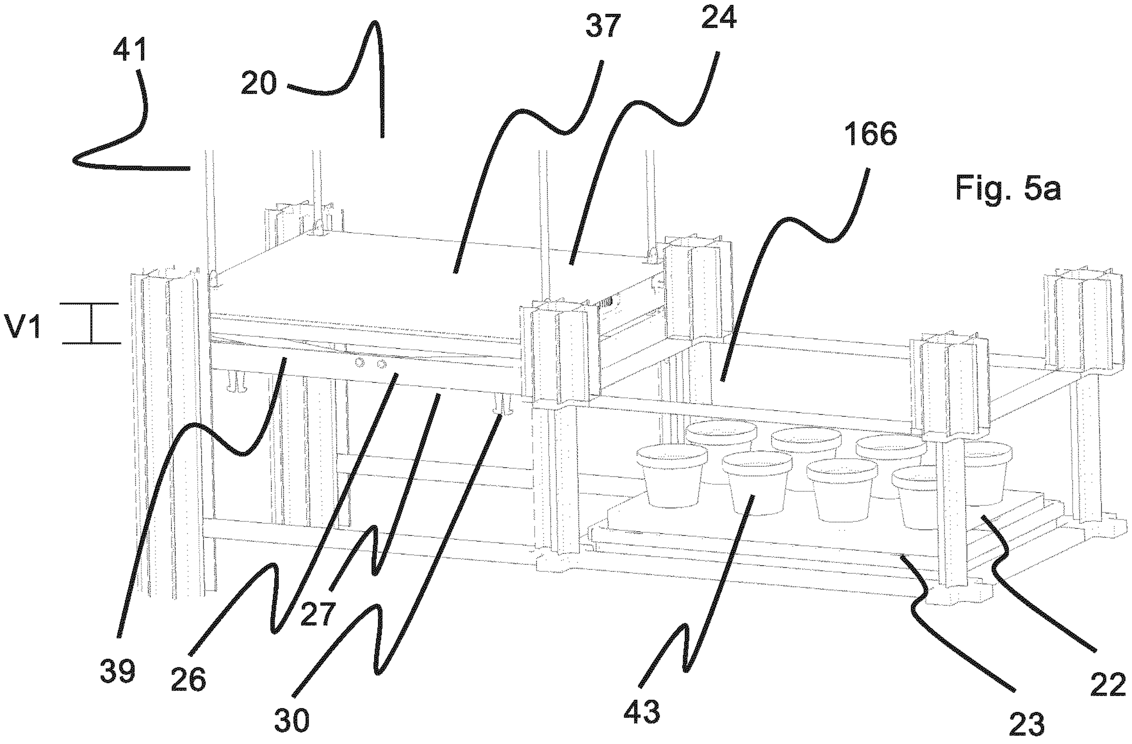

FIG. **5*b* is a different perspective view of an assembly for retrieving goods holders of FIG. 5*a*** in a second position according to an embodiment of the present invention.

FIG. **5*c* is a perspective view of an assembly for retrieving goods holders of FIG. 5*a*** in a third position according to an embodiment of the present invention.

Figure 6:
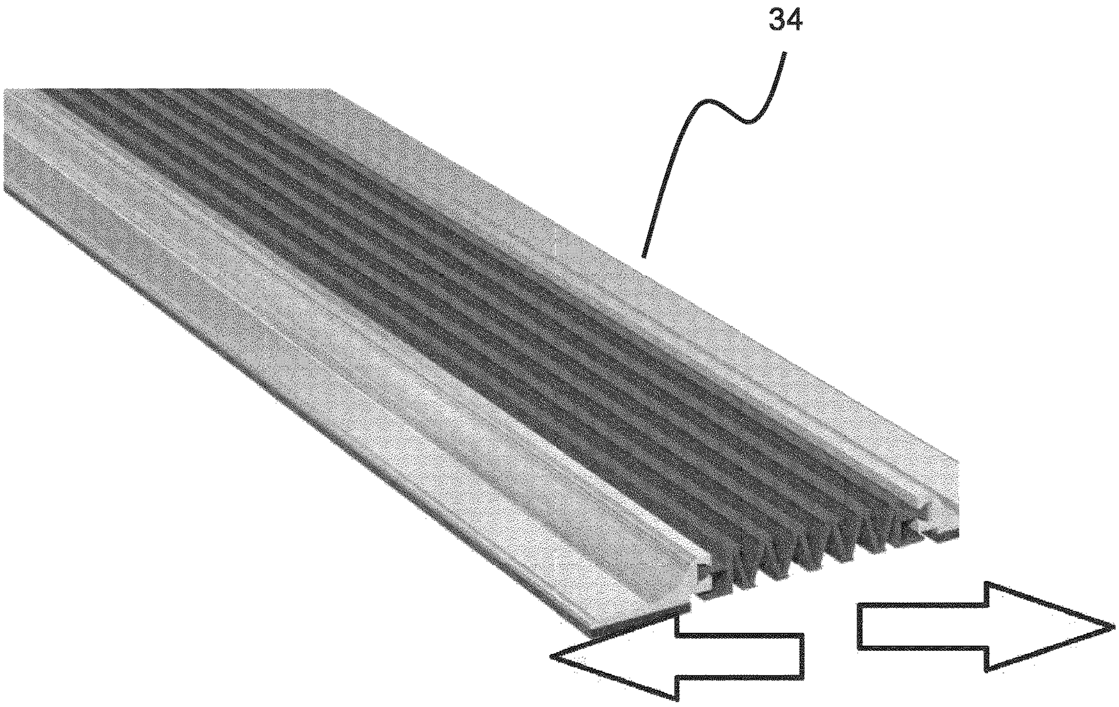

FIG. 6 is a close-up showing a collapsible side wall according to an embodiment of the present invention.

Figure 7:
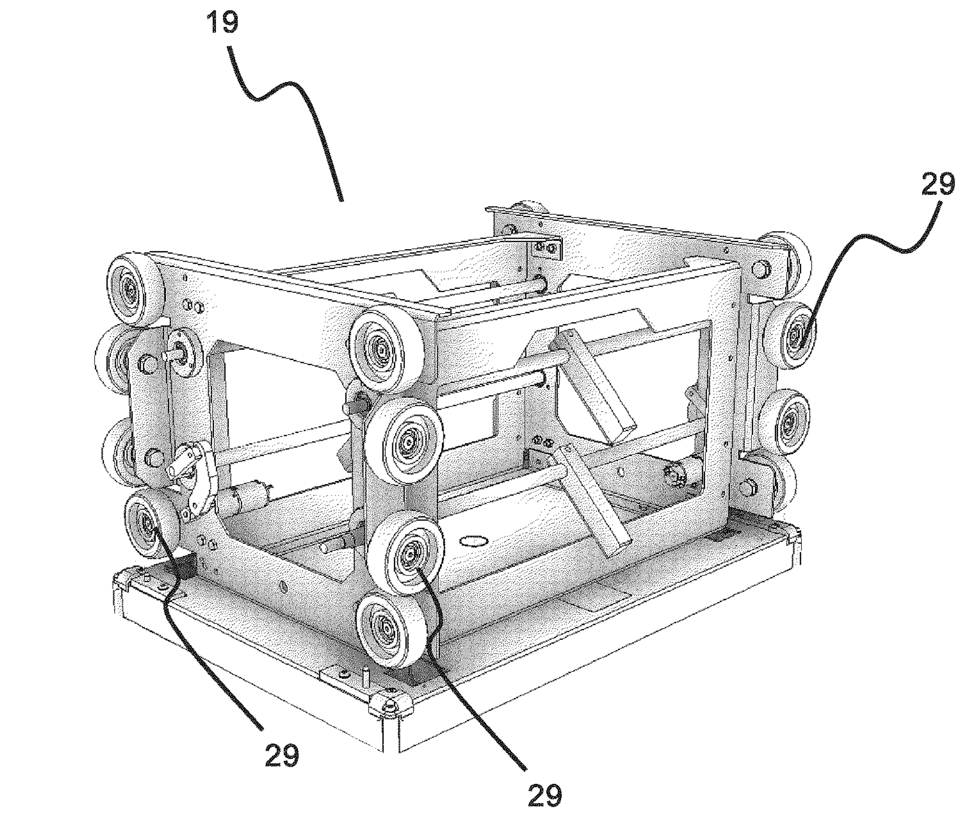

FIG. 7 shows a lifting frame guide according to an embodiment of the present invention.

Figure 8:
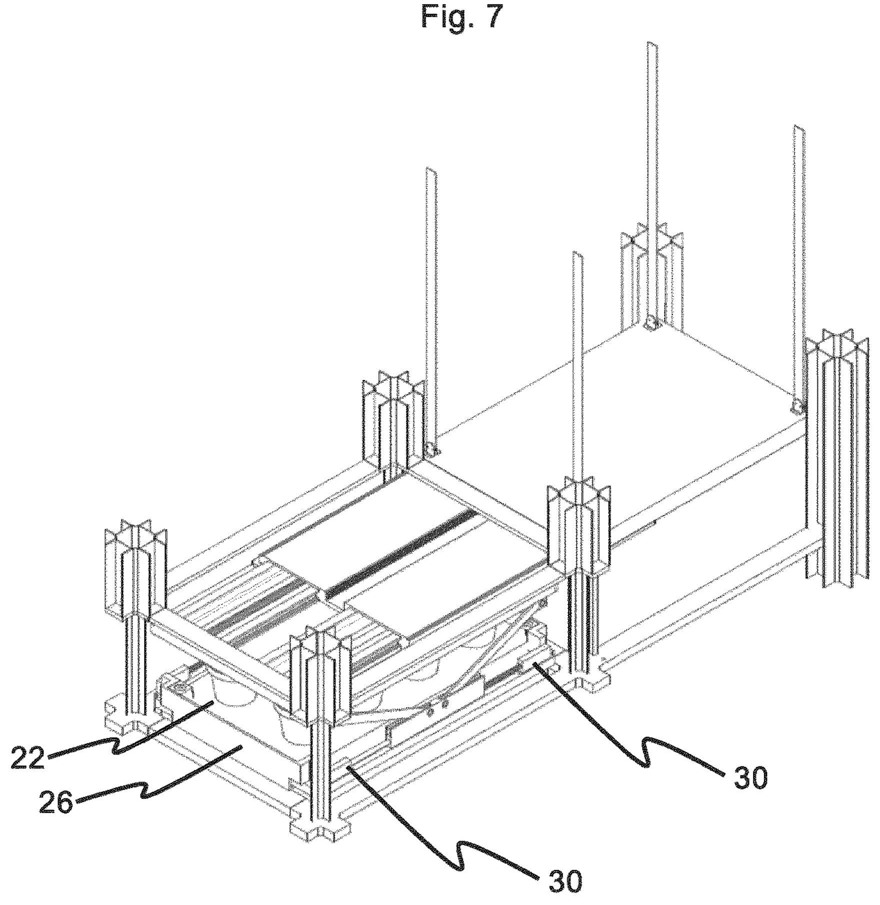

FIG. 8 is a perspective view of an assembly for retrieving goods holders according to another embodiment of the present invention.

DETAILED DESCRIPTION OF THE INVENTION

In the following, embodiments of the invention will be discussed in more detail with reference to the appended drawings. It should be understood, however, that the drawings are not intended to limit the invention to the subject-matter depicted in the drawings.

The framework structure 100 of the automated storage and retrieval system 1 is constructed in accordance with the prior art framework structure 100 described above in connection with FIGS. 1-4, i.e. a number of upright members 102, and further that the framework structure 100 comprises a first, upper rail system 108 in the X direction and Y direction.

The framework structure 100 further comprises storage compartments in the form of storage columns 105 provided between the members 102 where storage containers 106 are stackable in stacks 107 within the storage columns 105.

The framework structure 100 can be of any size. In particular, it is understood that the framework structure can be considerably wider and/or longer and/or deeper than disclosed in FIG. 1. For example, the framework structure 100 may have a horizontal extent of more than 700×700 columns and a storage depth of more than twelve containers.

Various aspects of the present invention will now be discussed in more detail with reference to FIGS. 5-7.

Figure 1:
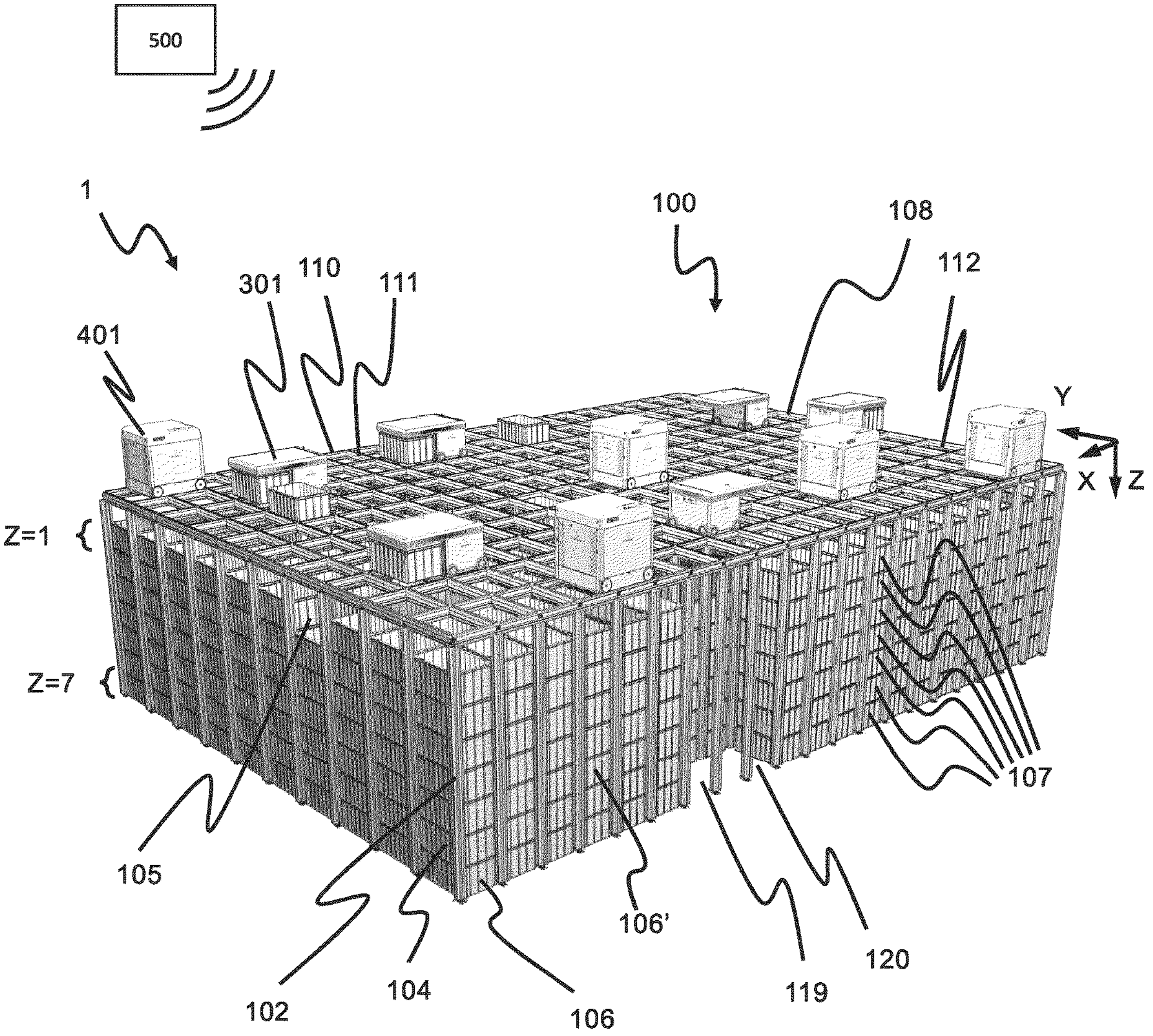
Fig. 1 (Prior Art)
FIG. 1 is a perspective view of a framework structure of a prior art automated storage and retrieval system.
Figure 2:
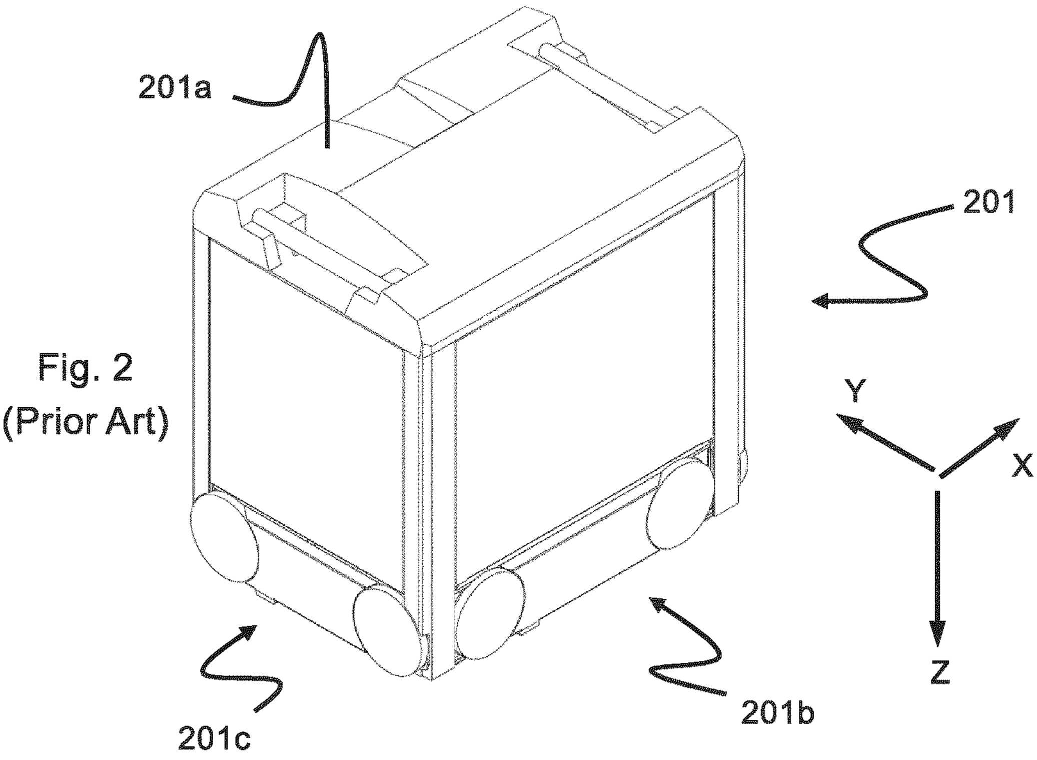
Fig. 2 (Prior Art)
FIG. 2 is a perspective view of a prior art container handling vehicle having an internally arranged cavity for carrying storage containers therein.
Figure 3:
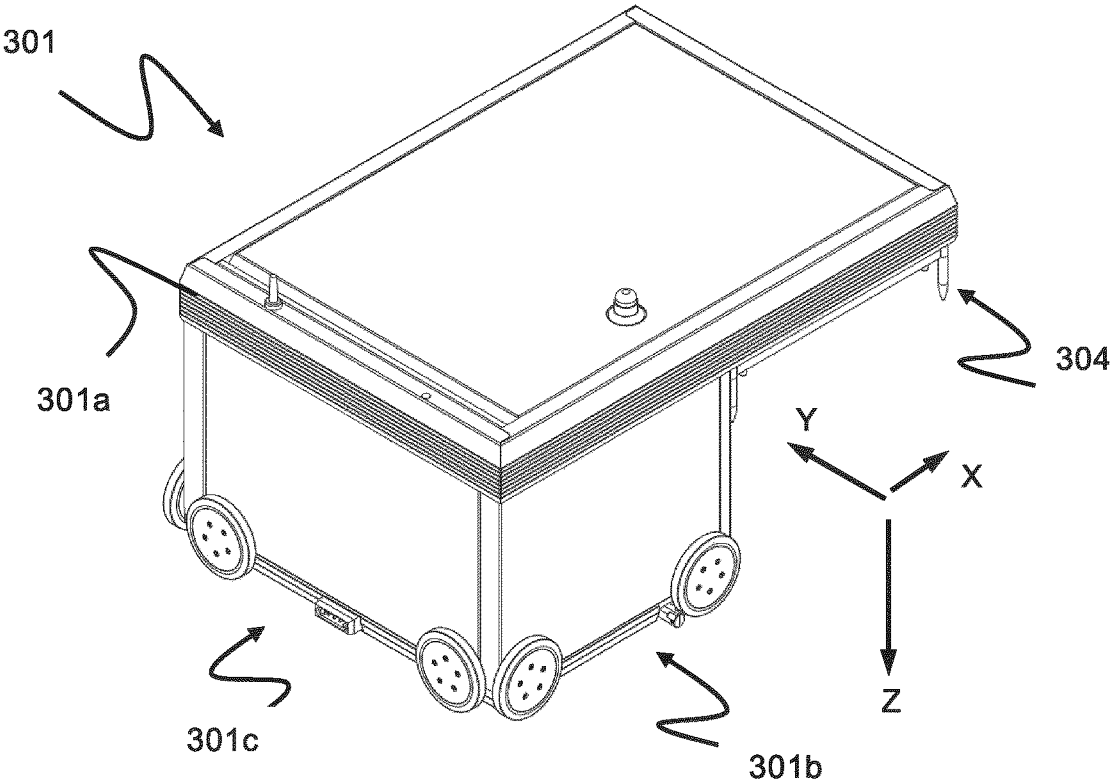
Fig. 3 (Prior Art)
FIG. 3 is a perspective view of a prior art container handling vehicle having a cantilever for carrying storage containers underneath.
Figure 4:
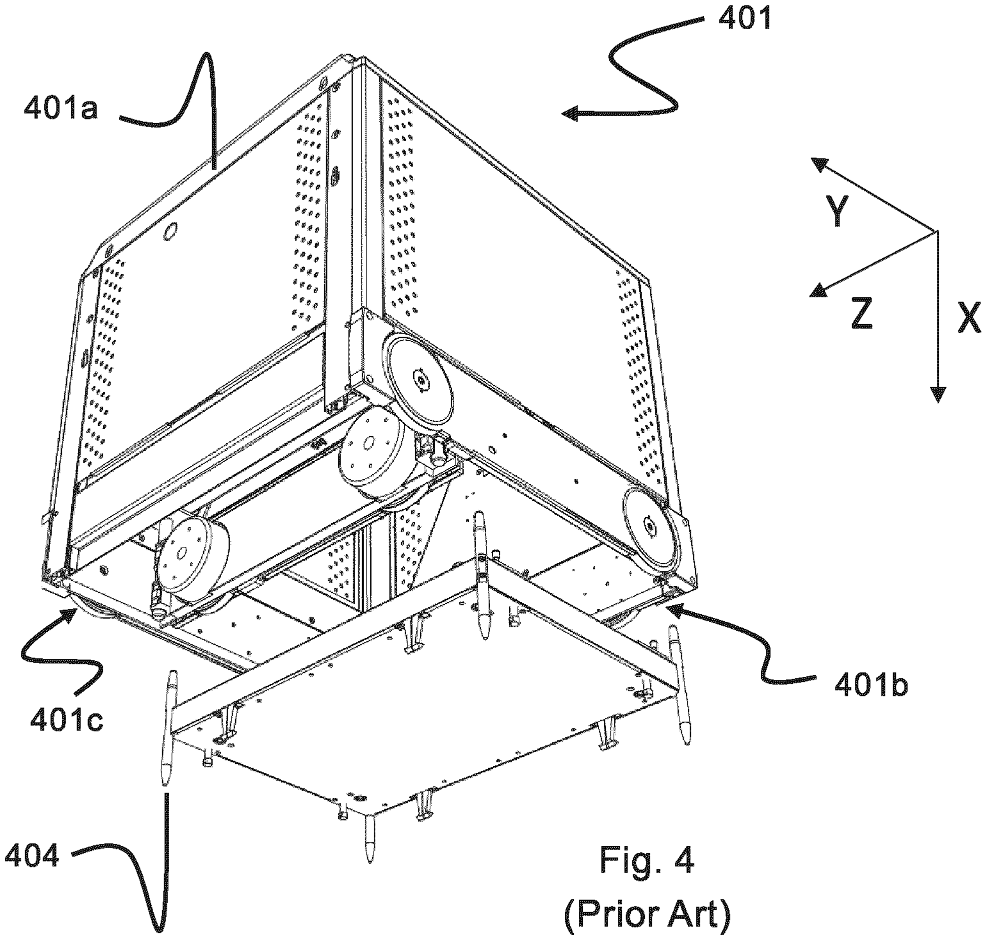
Fig. 4 (Prior Art)
FIG. 4 is a perspective view, seen from below, of a prior art container handling vehicle having an internally arranged cavity for carrying storage containers therein.

FIG. 5*a* is a perspective view of an assembly 20 for retrieving goods holders according to an embodiment of the present invention. Here, the goods holder may e.g. be a storage container, a bin, a tote, a pallet, a tray or similar. Different types of goods holders may be used in the same system. The shown assembly 20 is particularly suitable for handling storage trays 22. The assembly 20 is part of a larger, automated, grid-based system (a representative type of such a system is shown in FIG. 1) for storage and retrieval of storage elements. The assembly 20 comprises a base body 24 for connection to a lifting device (not shown) by means of hoisting/lifting bands 41. Lifting device is a part of a handling vehicle, such as those shown in FIGS. 2-4, that hoists and lowers goods holders in a storage column (both shown in FIG. 1). The assembly 20 also comprises a lifting frame 26 having a central opening (obscured by the base body in FIG. 5*a*), said lifting frame 26 being here arranged at a first vertical distance V1 below said base body 24. In FIG. 5*a*, engagement means 30 associated with the lifting frame 26 and for engaging with the goods holder 22 comprises a pair of gripper elements 30 arranged at a bottom face 27 of the lifting frame 26, more specifically on a first long side 39. Although not visible in FIG. 5*a*, another pair of gripper elements is arranged on a long side being arranged opposite said first long side 39. Still with reference to FIG. 5*a*, loose pots 43, representing items to be handled, are disposed on a storage tray 22 placed in a storage column 166 being adjacent to the storage column holding the assembly 20.

Figure 5B:
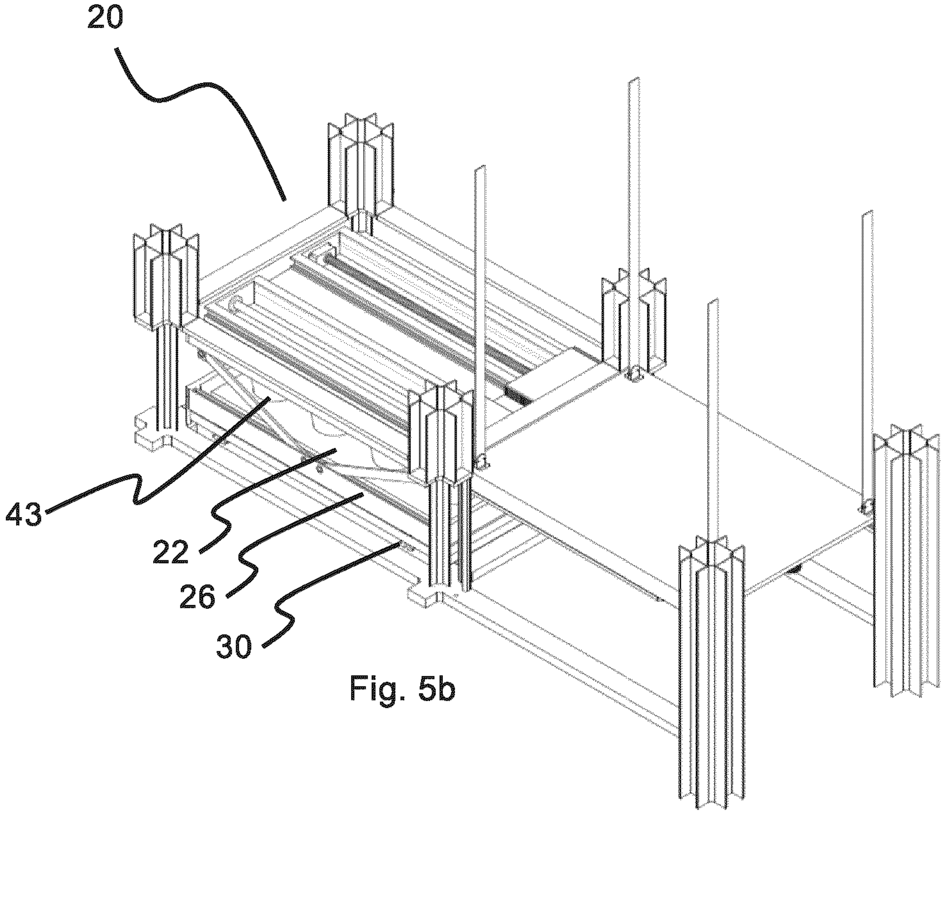

FIG. 5*b* is a different perspective view of an assembly for retrieving storage elements of FIG. 5*a* in a second position according to an embodiment of the present invention. Here, engagement means 30, embodied as gripper elements 30 of the lifting frame 26, is engaged with the storage tray 22 supporting the loose pots 43. The storage tray 22 is still placed in the storage column adjacent to the storage column holding the assembly 20.

Figure 5C:
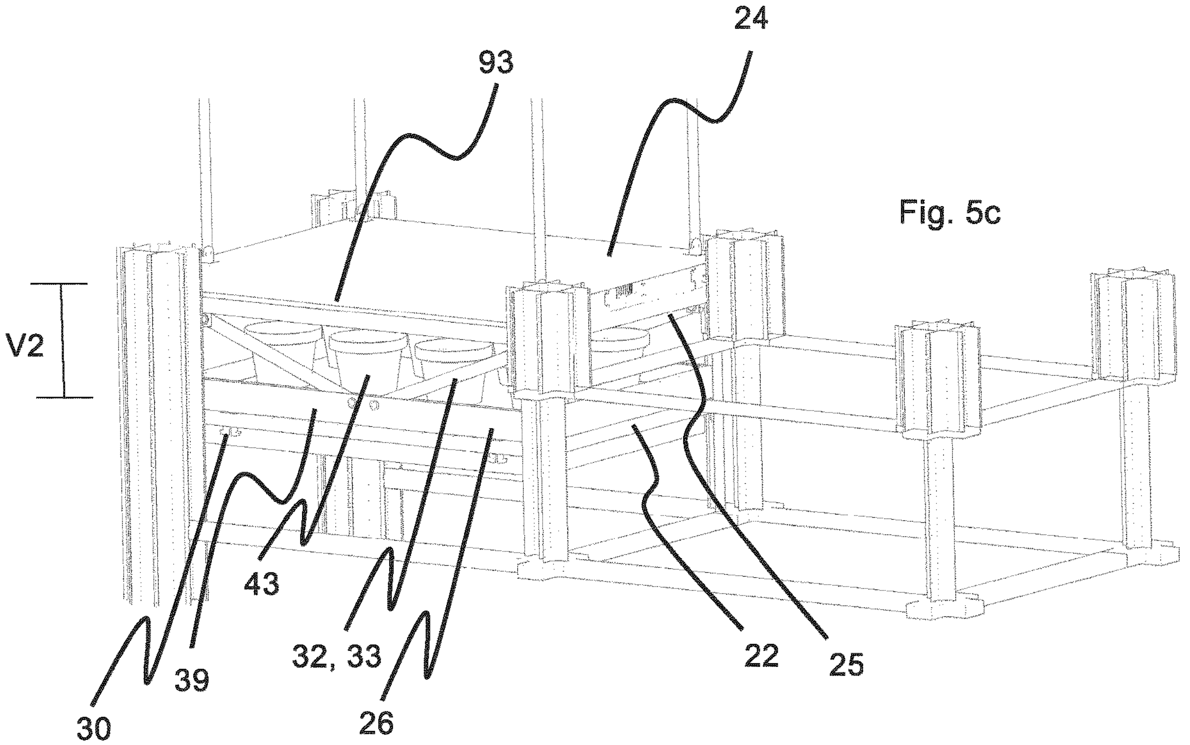

FIG. 5*c* is a perspective view of an assembly 20 for retrieving storage elements of FIG. 5*a* in a third position according to an embodiment of the present invention. For the sake of brevity, only elements not described in connection with FIGS. 5*a*-5*b* will be discussed in detail. As clearly visible, a pair of slantingly arranged linking members 33 connects a first long side 39 of the lifting frame 26 and a first long side 93 of the base body 24. Although not visible in FIG. 5*c*, an identical pair of slantingly arranged linking members connects a second long side of the lifting frame 26 and a second long side of the base body 24. As easily seen, the linking members 33 are attached to the lifting frame 26 near mid-point of the lifting frame 26 and to the base body 24 near corners of the base body 24. In an alternative embodiment (not shown), the linking members are attached to the lifting frame near corners of the lifting frame and to the base body near mid-point of the base body. In yet another embodiment, a plurality of telescopic members (not shown) provided in the corners of the base body and of the lifting frame connects said base body with said lifting frame.

In FIG. 5*c*, the storage tray 22 with loose pots 43 has been laterally transferred from the adjacent column 166 discussed in FIGS. 5*a*-5*c* into the storage column holding the assembly 20. The method for performing this operation will be discussed further below. Still with reference to FIG. 5*c*, the lifting frame 26 is arranged at a second vertical distance V2 below said base body 24. As V2 is larger than V1, the vertical distance between the lifting frame 26 and the base body 24 is variable. In certain embodiments, the lifting frame 26 is movable while the base body 24 is fixed. In other embodiments, both the lifting frame 26 and the base body 24 are movable.

Hereby, a more versatile storage element handling solution is obtained as it becomes possible to optimize the vertical size of the storage container and greatly reduce dead volume in the interior of the container. In consequence, more storage elements may be stored in a standard storage column of FIG. 1 having a predetermined size. In addition, many problems, frequently encountered when handling conventional storage bins of given height may be alleviated. One of these problems is the presence of improperly loaded, thus overfilled, storage bins with items bulging out of the storage bin and preventing proper gripping and securing of the storage bin. These situations are also remedied by the assembly in accordance with the first aspect of the invention.

The assembly features in accordance with the first aspect of the invention lend the assembly, as well as the entire system, particularly suitable for applications within the field of vertical farming, where dead volume is preferably completely eliminated. Similar arguments are equally valid for use of the assembly in microfulfillment centers, typically comprising a limited number of storage containers.

Turning back to FIG. 5*c*, once the lifting frame 26 is in a selected position relative to the base body 24, a locking element, for instance a latch, may be used in order to lock said lifting frame 26 in said position. In one embodiment, the selected position is achieved immediately after the gripper element(s) 30 is/are engaged with the storage tray 22 of FIG. 5*b*. In an alternative embodiment, the base body 24 is further lowered after the lifting frame 26 is locked in the selected position.

Still with reference to FIG. 5*c*, top portions of the loose pots 43 supported by the storage tray 22 are contacted by the base body 24, whereby the pots 43 become immobilized. In a further, related embodiment (not shown), a side 25 of the base body 24 that faces the lifting frame 26 could be provided with protruding elements of suitable shape and size for further stabilization of the pots.

With reference to FIGS. 5*a*-5*c*, the lifting frame 26 is extendable in its longitudinal direction until said at least one gripper element 30 associated with the frame 26 is aligned with a corresponding peripheral through-recess 23 of a storage tray 22 positioned in an adjacent storage column 166. Actuators (not shown), such as hydraulic/pneumatic/electrical actuators, could bias the frame parts between at least a first position and a second position. Accordingly, the extension movement is completed once gripper element 30 is in the second position, i.e. is aligned with a corresponding peripheral through-recess 23 (visible in FIG. 5*a*) of a storage tray 22 positioned in the adjacent storage column 166. The lifting frame 26 is subsequently lowered whereby the vertical distance between the lifting frame 26 and the base body 24 is increased. The lowering continues until the gripper element 30 is accommodated in said recess 23. Once accommodated in the recess 23, the gripper element 30 is activated, whereby the lifting frame 26 is firmly engaged with the storage tray 22. Subsequently, the parts of the lifting frame 26 are biased to raise and/or retract, typically by means of an actuator, until they reach the first position, where the lifting frame 26 is aligned with the base body 24 in the original storage column.

FIG. 6 is a close-up showing a collapsible side wall 34 according to an embodiment of the present invention. The wall 34 is extendable in directions indicated by the arrows. While shown in isolation in FIG. 6, said collapsible side wall 34 normally spans between the base body and the lifting frame. Hereby, a storage tray and the collapsible side walls 34 act as a flexible enclosure, retaining all advantages discussed in connection with FIGS. 5*a*-5*c* while greatly facilitating vertical/horizontal transport of loose items such as pots of FIGS. 5*a*-5*c*. Typically, the wall 34 is predominantly made in a durable, pleated polymer material such that said wall may have variable length while retaining its functionality.

FIG. 7 shows a lifting frame guide 19 according to an embodiment of the present invention. Its purpose is to prevent tilting of the base body and/or of the lifting frame, in particular when the assembly retrieves a storage container from the adjacent storage column (scenario discussed in connection with FIGS. 5*a*-5*c*). The lifting frame guide 19 is fixedly connected to the base body and provided on a side of the base body facing away from the lifting frame 37 (shown in FIG. 5*a*). As seen in FIG. 7, the lifting frame guide 19 comprises a plurality of wheels 29, said wheels having at least two different orientations.

An assembly 20 discussed in connection with FIGS. 5*a*-5*c* is a part of an automated, grid-based storage and retrieval system 1 of the type shown in FIG. 1. Still with reference to FIG. 1, said system 1 could comprise a framework structure 100 with a plurality of storage columns for storing storage elements 106, wherein a rail system 108 is arranged across the top of the framework structure 100, wherein a plurality of container handling vehicles 201, 301, 401 operates on said rail system, A container handling vehicle 201, 301, 401 comprises a lifting device for vertical transportation of the storage elements 106 in a storage column 105. With reference to FIG. 5*a*, the system comprises a storage tray 22 with at least one peripheral through-recess 23 for accommodating the at least one gripper element 30 provided in a section of the lifting frame 26.

FIG. 8 is a perspective view of an assembly for retrieving storage elements according to another embodiment of the present invention. More specifically, in FIG. 8 the engagement means 30 is a clamping mechanism, typically biased by means of an actuator (not shown). When the lifting frame 26 is in engagement with the goods holder 22 said lifting frame 26 contacts periphery of the goods holder 22. The firmly held goods holder 22 may now be moved, in either horizontal or vertical direction. All other features of the solution presented in FIG. 8, i.e. features not dependent on the functioning of the engagement means, are identical with features described in connection with FIGS. 5-7.

In the preceding description, various aspects of the delivery vehicle and the automated storage and retrieval system according to the invention have been described with reference to the illustrative embodiment. For purposes of explanation, specific numbers, systems and configurations were set forth in order to provide a thorough understanding of the system and its workings. However, this description is not intended to be construed in a limiting sense. Various modifications and variations of the illustrative embodiment, as well as other embodiments of the system, which are apparent to persons skilled in the art to which the disclosed subject matter pertains, are deemed to lie within the scope of the present invention.

LIST OF REFERENCE NUMBERS

1 Storage and retrieval system
19 Lifting frame guide
20 Assembly for handling storage elements
22 Storage tray
23 Peripheral through-recess
24 Base body
25 Side of the base body that faces the lifting frame
26 Lifting frame
27 Bottom face of the lifting frame
29 Plurality of wheels
30 Gripper element
32 Connecting element
33 Linking members
34 Collapsible side wall
37 Side of the base body facing away from the lifting frame
39 First long side of the lifting frame
41 Hoisting/lifting bands
43 Loose pots
93 First long side of the base body
100 Framework structure
102 Upright members of framework structure
104 Storage grid
105 Storage column
106 Storage container
106' Particular position of storage container
107 Stack of storage containers
108 Rail system
110 Parallel rails in first direction (X)
111 Parallel rails in second direction (Y)
112 Access opening
119 First port column
120 Second port column
166 Adjacent storage column
201 Container handling vehicle belonging to prior art
201*a* Vehicle body of the container handling vehicle 201
201*b* Drive means/wheel arrangement, first direction (X)
201*c* Drive means/wheel arrangement, second direction (Y)
301 Cantilever-based container handling vehicle belonging to prior art
301*a* Vehicle body of the container handling vehicle 301
301*b* Drive means in first direction (X)
301*c* Drive means in second direction (Y)
401 Container handling vehicle belonging to prior art
401*a* Vehicle body of the container handling vehicle 401
401*b* Drive means in first direction (X)
401*c* Drive means in second direction (Y)
X First direction
Y Second direction
Z Third direction
V1, V2 Vertical distance

The invention claimed is:

1. An assembly for handling a goods holder, such as a storage container, a storage tray, and/or a storage pallet, of an automated storage and retrieval system, said assembly comprising:

a base body for connection to a lifting device for vertical transportation of the goods holder in a storage column, a lifting frame having a central opening, said lifting frame being arranged at a vertical distance below said base body, engagement means associated with the lifting frame and for engaging with the goods holder, at least one connecting element for connecting the lifting frame and the base body, wherein the vertical distance between the lifting frame and the base body is variable; and a lifting frame guide for preventing tilting of the base body and/or the lifting frame, wherein the lifting frame guide comprises a plurality of wheels, said wheels having at least two different orientations.

2. The assembly according to claim 1, wherein at least one of the lifting frame and the base body is movable relative to the other one.

3. The assembly according to claim 1, wherein the assembly further comprises a locking element for locking the lifting frame in a selected position relative to the base body.

4. The assembly according to claim 1, wherein the at least one connecting element comprises two pairs of oppositely provided linking members.

5. The assembly according to claim 4, wherein said linking members are attached to the lifting frame near mid-point of the lifting frame and wherein said linking members are attached to the base body near corners of the base body.

6. The assembly according to claim 4, wherein said linking members are attached to the lifting frame near corners of the lifting frame and wherein said linking members are attached to the base body near mid-point of the base body.

7. The assembly according to claim 1, wherein the at least one connecting element comprises a plurality of telescopic members provided in the corners of the base body and of the lifting frame.

8. The assembly according to claim 1, wherein the assembly further comprises at least one collapsible side wall extending between the base body and the lifting frame.

9. The assembly according to claim 1, wherein a side of the base body that faces the lifting frame is provided with protruding elements.

10. The assembly according to claim 1, wherein the lifting frame guide is fixedly connected to the base body and provided on a side of the base body facing away from the lifting frame.

11. The assembly according to claim 1, wherein the engagement means is at least one gripper element arranged at a bottom face of the lifting frame.

12. The assembly according to claim 1, wherein the engagement means is a clamping mechanism, wherein the lifting frame contacts periphery of the goods holder when said lifting frame is in engagement with the goods holder.

13. An automated storage and retrieval system comprising a framework structure that comprises a plurality of storage columns for storing at least one goods holder, wherein a rail system is arranged across the top of the framework structure, wherein a plurality of handling vehicles operates on said rail system, and wherein at least one handling vehicle of the plurality of handling vehicles comprises a lifting device for vertical transportation of the at least one goods holder in a storage column of the plurality of storage columns, said automated storage and retrieval system comprising an assembly for handling the at least one goods holder, such as a storage container, a storage tray, and/or a storage pallet, of the automated storage and retrieval system, said assembly comprising:

a base body for connection to the lifting device for vertical transportation of the at least one goods holder in the storage column, a lifting frame having a central opening, said lifting frame being arranged at a vertical distance below said base body, engagement means associated with the lifting frame and for engaging with the at least one goods holder, at least one connecting element for connecting the lifting frame and the base body, wherein the vertical distance between the lifting frame and the base body is variable; and a lifting frame guide for preventing tilting of the base body and/or of the lifting frame, wherein the lifting frame guide comprises a plurality of wheel, said wheels having at least two different orientations.

14. The automated storage and retrieval system according to claim 13, wherein the storage tray comprises at least one peripheral through-recess for accommodating at least one gripper element.

15. A method for handling a goods holder, such as a storage container, a storage tray, and/or a storage pallet, of an automated storage and retrieval system, said method comprising:

providing a base body for connection to a lifting device being part of container handling vehicle, wherein the lifting device vertically transports the goods holder in a storage column, providing a lifting frame having a central opening, said lifting frame being arranged at a vertical distance below said base body, connecting the lifting frame and the base body by means of at least one connecting element so that the vertical distance between the lifting frame and the base body is variable, providing engagement means associated with the lifting frame and for engaging with the goods holder; and providing a lifting frame guide for preventing tilting of the base body and/or of the lifting frame, wherein the lifting frame guide comprises a plurality of wheels, said wheels having at least two different orientations.

16. The method according to claim 15, said method further comprising:

locking the lifting frame in a selected position relative to the base body.

17. The method according to claim 16, said method further comprising:

locking the lifting frame in the selected position, after the engagement means is engaged with the goods holder.

18. The method according to claim 17, said method further comprising:

lowering the base body, after the lifting frame is locked in the selected position.

19. The method according to claim 15, wherein the engagement means is at least one gripper element arranged at a bottom face of the lifting frame, said method further comprising:

extending the lifting frame in its longitudinal direction until said at least one gripper element is aligned with a corresponding peripheral through-recess of the storage tray positioned in an adjacent storage column.

20. The method according to claim 19, said method further comprising:

lowering the lifting frame until said at least one gripper element is accommodated by the corresponding peripheral through-recess and engaged with the storage tray.

21. The method according to claim 20, said method further comprising:

retracting the lifting frame until the lifting frame is re-aligned with the base body.

* * * * *